Oct. 28, 1958     L. D. STATHAM     2,858,400

ELECTRICAL STRAIN WIRE TRANSDUCER

Filed Aug. 20, 1956

INVENTOR,
LOUIS D. STATHAM
BY Philip Subkow
ATTORNEY.

United States Patent Office

2,858,400
Patented Oct. 28, 1958

2,858,400

ELECTRICAL STRAIN WIRE TRANSDUCER

Louis D. Statham, Beverly Hills, Calif., assignor to Statham Instruments, Inc., a corporation of California Application August 20, 1956, Serial No. 604,976

20 Claims. (Cl. 201—63)

This application is a continuation-in-part of application Serial No. 502,663, filed April 20, 1955, now Patent No. 2,760,037.

This invention relates to transducers of the electrical resistance strain wire type, in which the force or displacement induces a variation in tension in a filament and means are provided for determining the variation in resistance resulting from the variation in tension in the filament.

Generally stated then my invention relates to a transducer of the electrical resistance strain wire type consisting of a force summing member and at least two wires, one thereof being attached and extending therefrom in tension from a first point of attachment, and the other of said wires extending in tension from a second point of attachment, both of said wires being connected at a third point of attachment to a yieldable constraining means, also attached to a force summing means, and means whereby on displacement of said force summing means, a relative displacement of said third point of attachment relative to the first and second point of attachment occurs.

The first and second points of attachment may be ones which are not displaced in space on the motion of the force summing means, for example, the first and second point of attachment may each be fixed rigidly in space, for example attached to a fixed point in a frame, which, as in the figures, may be the case of the transducer.

In the preferred embodiment of my invention electrical resistance strain wires are employed as filaments and the constraint imposed upon the first point of attachment should preferably have a spring rate which is substantially less than the spring rate of the wires. The spring rate as referred to in this specification is understood to be the ratio of the force exerted on the wires or spring or other constraining means to the resultant displacement produced in the wires and the spring constraining means respectively. Thus a given force exerted on the wires and the constraining means respectively should result in a variation in strain in the wires much less than the resultant displacement of the constraining means. For example, if the constraining means is a spring, the extension or movement of the spring resulting from the application of a given magnitude of force to the force summing means should be greater than the variation in the strain in the wires resulting from the application of the same magnitude of force. As will be understood by those skilled in the art, the spring rate is the Hook's law constant of the tensioned members and of the constraining means where such constraining means is a spring.

In the structure of my transducer I prefer to use a flat strip of metal to act as a spring. The higher the spring rate of the constraining means, for example, the spring, i. e., as the constraining means becomes stiffer the force transfer from one wire to the other falls further and further from 100% and becomes zero when the third point of attachment is considered to be a rigid connection to the force summing means. No transfer of force from the first to the second tensioned members results. However, by employing a spring rate for the constraining means substantially less than the spring rate of the tensioned members, I may obtain practically complete transfer of force from one wire to the other wire. By holding the spring rate of the constraining means within the range of about 0.01 and even down to about 0.001 of the spring rate of the tension members, I may obtain a substantially complete transfer of force so that the variation in tension in one of the tensioned members may be more than about 99% of the variation in tension in the other tension member.

A movement of the force summing means, which results in a reduction in tension in one of the wires and increase in the tension in the other of the wires of the strain wire transducer, will cause an increase in the tension of such wire for so long as any residual tension remains in the wire whose tension is decreasing upon the motion of the force summing means. But when the original tension is removed from one of the wires any further movement of the force summing means in the same direction will have no effect upon the other of the wires and such other tensioned member will be only subject to the tension which is imposed upon it by the constraining means itself. Thus, where the wires extending in the tensioned members may be subject to damage because of an excessive movement of the force summing means, the transducer of my invention acts to introduce an overload safety means to prevent an exertion of tension in excess of the safe tension load which may be imposed upon the tensiometer.

In the preferred embodiment presented in this application, I employ a flat spring as the constraining means and connecting the wires thereto so that the spring is held cantilevered from the force summing means. The spring is flexible in a direction perpendicular to the extension of the plane of the spring and parallel to the general direction of the extension of the wires but substantially rigid along any line in the plane of the spring and in the direction of motion of the force summing means. Thus, the spring moves in a one-to-one ratio to the motion of the force summing means. The spring is preferably substantially greater in width and length than it is in thickness, which thickness is in the general direction of the extension of the wires and the deflection of the spring, as is illustrated in Figs. 1 and 2.

These and other objects of my invention will be further described in connection with the drawings of which:

Figure 1:
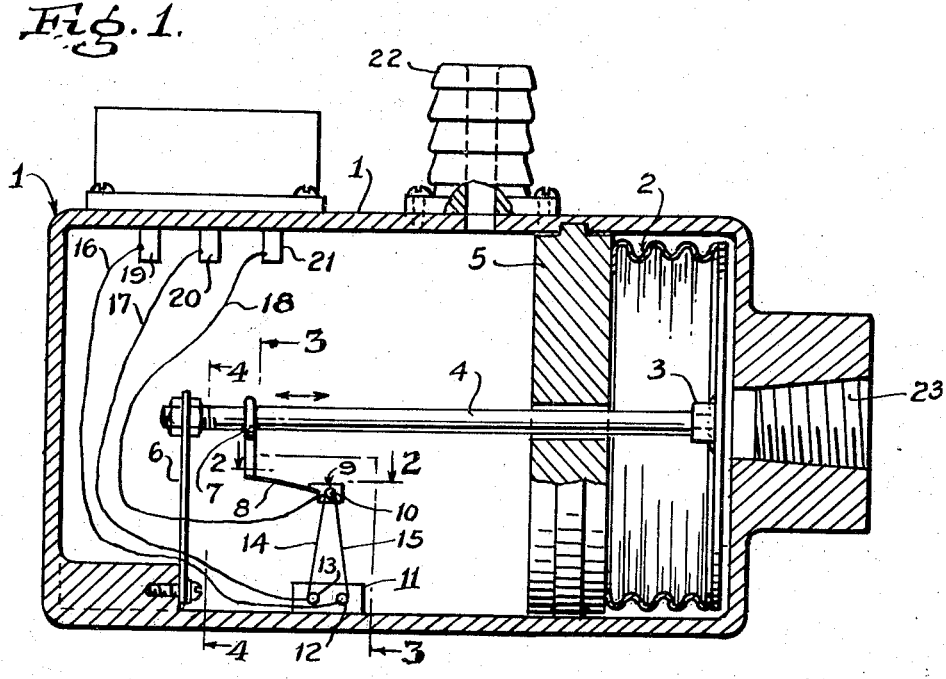
Fig. 1 is a vertical section.
Figure 2:
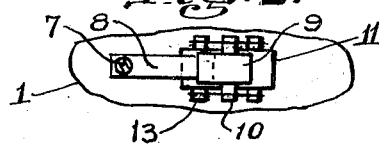
Fig. 2 is a fragmentary section taken on line 2—2 of Fig. 1.
Figure 3:
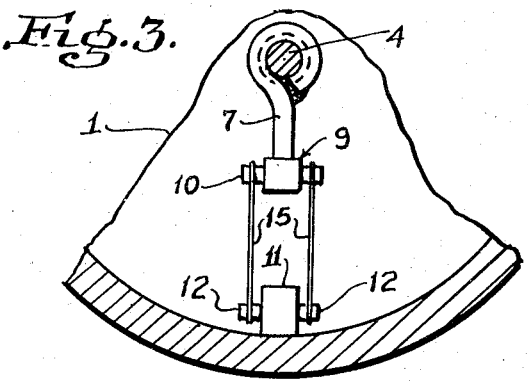
Fig. 3 is a fragmentary section on line 3—3 of Fig. 1.
Figure 4:
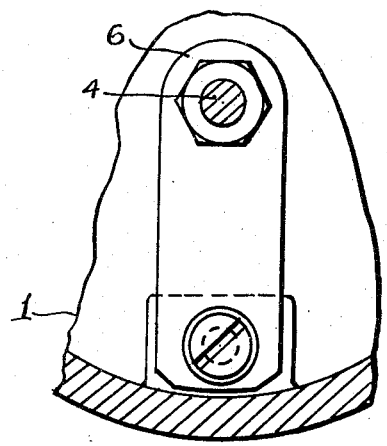
Fig. 4 is a fragmentary section taken on line 4—4 of Fig. 1.

A frame or case 1 carrying a flexible member such as a flexible diaphragm or bellows 2 connected at its periphery to case 1 and carrying a central boss 3 from which extends a rod 4 which passes through the disc 5 and is connected to the flexible beam 6 mounted in case 1. The rod, which acts as a force summing means, carries an arm 7 rigidly connected to the rod 4 as by welding and carries a cantilevered flat spring 8 on which is mounted insulated pin carrier 9 from which two axially aligned pins 10 extend.

Rigidly mounted on the case 1 is a pin carrier block 11 which carries two insulating pins 12 and 13. The two insulating pins are rigidly mounted so that the separation of pins 12 and 13 is invariant. Two identical electrical resistance strain wires 14 and two like wires 15 are stretched in tension between pins 10 and 12 and also 13, all of the wires being identical. They are electrically connected to terminals 21, 19 and 20 by leads 16, 17 and 18 for connection in a Wheatstone bridge, as is conventional for electrical resistance strain transducers. The pins 10 are positioned equidistant between pins 12 and 13. The initial tension on the wires 14 and 15 will cause a bowing of the spring 8, the transverse plane of the spring 8 facing the pins 12 and 13.

The wires 14 and 15 extend in equal tension. It will be observed that any movement of the diaphragm on application of a differential pressure through 22 and 23, is in the direction of one of the arrows depending on the direction of the pressure difference and that an equal motion of the pins 10 will occur, the spring 8 being rigid in the direction of this motion. A reduction in the tension of one of the wires occurs depending on the direction of the motion of the rod and an increase in tension in the other of the wires as well as a change in deflection, i. e., the degree of flexure of the spring.

By holding the spring rate of the spring 8 in the range of about .01 to .001 of the spring rate of the wires, the efficiency or magnitude of output of the bridge will be from 99.5% to 99.95% of the total theoretical output of such bridge theoretically obtainable when the spring rate of the spring is equal to zero. Giving effect to the efficiency of the transfer of stresses from one wire to the other, the total transfer of stress from one wire to the other cannot be greater than the variation in stress imposed on any one of the wires. For example, therefore, upon total relaxation in the wires 14, the stress transfer from 14 to 15 cannot impose on 15 a stress greater than the original tension on the wire 14. With a finite spring rate of the spring 8 such transfer will impose a lesser increase in stress in 15 than the decrease in stress in 14, the difference being the increase in strain in the spring. By setting the magnitude of stress originally present in the wires when the diaphragm 2 or rod 4 are in their neutral unloaded position and the spring rate of spring 8, the wires 14 and 15 cannot be stressed beyond their original design limit.

The wires 14 and 15 may be so suitably tensioned that the sum of the tensile stress in the wires does not exceed, and usually is less than, the ultimate tensile stress of the wires. This will assure that when the one of the wires is completely relaxed that the total stress imposed upon the other in the pair does not part such tensioned member. Where the yield point of the tensioned member is not close to the ultimate tensile stress, i. e., the breaking point, it may be and usually is desirable to avoid damage to the tensioned members to make the total tension in the pair of tensioned members, i. e., the sum of the tensile stresses not to exceed the tensile stress at the yield point of the tensioned member or the proportionality limit of the tensioned members, whichever design limitation of stress is chosen. The proportionality limit is, as is well understood, the maximum strain which is a linear function of the stress. At all strains at or below this value, the ratio of stress to strain, i. e., the spring constant of the tension member is a constant, and beyond the proportionality limit it is not a constant. Thus, the wires may be stressed in tension each at one-half of the stress chosen as the design limit, as explained above, and the stress in each of the tensioned members of each pair may be equal in each pair, or unequal, as for example by way of illustration and not as a limitation at 80% of the design limit in one of the pair of tensioned members, and 20% in the other of said pair of tensioned members.

Preferably, the sum of the tensile stresses in the wires 14 and 15 will not be greater than the ultimate tensile stress of the wires 14 or 15 or the proportionality limit of the wires, whichever design criterion is chosen for this limit. Under such circumstances the maximum stress imposable on the wires will not injure either of them.

While I have described a particular embodiment of my invention for the purpose of illustration, it should be understood that various modifications and adaptations thereof may be made within the spirit of the invention as set forth in the appended claims.

I claim:

1. An electrical resistance strain wire transducer, comprising a strain wire, a flat spring, a force summing means, a mechanical connection between said force summing means and said spring, said spring extending as a cantilever from said connection, a first wire support mounted on said cantilever spring, a second wire support, a third wire support, means for maintaining the separation between the second and third support invariant, an electrical resistance strain wire connected to and extending in tension between the first and second supports and another electrical resistance strain wire connected to and extending in tension between the first and third support, and means for displacing the force summing means in the direction of extension of the spring relative to the second and third support, whereby one of said wires increases in tension while the other of said wires decreases in tension on said displacement of said force summing means.

2. A transducer according to claim 1, wherein the spring constant of said spring is less than the spring constant of said tensioned members.

3. A transducer according to claim 1, in which the spring constant of the spring is from about .1 to about .001 times the spring constant of the tensioned members.

4. An electrical resistance strain wire transducer, comprising electrical resistance strain wires, a flat spring, a force summing means, a mechanical connection between said force summing means and said spring, said spring extending as a cantilever from said connection, a first wire support on said cantilever spring, a second support, a third support, means for maintaining the separation between the second and third support invariant, an electrical resistance strain wire connected to and extending in tension between the first and second supports and a second electrical resistance wire connected to and extending in tension between the first and third support, the sum of the tensions in the wires being less than the ultimate tensile stress of the wires, and means for displacing the force summing means in the direction of the extension of the spring and relative to the second and third support, whereby one of said wires increases in tension while the other of said wires decreases in tension on said displacement of said force summing means.

5. A transducer according to claim 4, wherein the spring constant of said spring is less than the spring constant of said tensioned members.

6. A transducer according to claim 4 in which the spring constant of the spring is from about .1 to about .001 times the spring constant of the tensioned members.

7. An electrical resistance strain wire transducer, comprising a movable force summing means, a flat spring, a force summing means, a mechanical connection between said force summing means and said spring, said spring extending as a cantilever from said connection, a first wire support mounted on said cantilever spring, a frame, a second wire support rigidly mounted on said frame, a third wire support rigidly mounted on said frame, an electrical resistance strain wire connected to and extending in tension between the first and second supports and another electrical resistance strain wire connected to and extending in tension between the first and third support, and means for displacing said force summing means in the direction of extension of the spring relative to the second and third support, whereby one of said wires increases in tension while the other of said wires decreases in tension on said displacement of said force summing means.

8. A transducer according to claim 7, wherein the spring constant of said spring is less than the spring constant of said wires.

9. A transducer according to claim 7 wherein the spring constant of the spring is from about .1 to about .001 times the spring constant of the wires.

10. In the transducer of claim 4, wherein the tensions in said wires are equal.

11. In the transducer of claim 5, wherein the tensions in said wires are equal.

12. In the transducer of claim 6, wherein the tensions in said wires are equal.

13. In the transducer of claim 7, wherein the tensions in said wires are equal.

14. In the transducer of claim 8, wherein the tensions in said wires are equal.

15. In the transducer of claim 9, wherein the tensions in said wires are equal.

16. An electrical resistance strain wire transducer, comprising a strain wire, a spring, a force summing means, a mechanical connection between said force summing means and said spring, a first wire support mounted on said spring, a second wire support, a third wire support, means for maintaining the separation between the second and third support invariant, an electrical resistance strain wire connected to and extending in tension between the first and second supports and another electrical resistance strain wire connected to and extending in tension between the first and third support, and means for displacing the force summing means in the direction of extension of the spring relative to the second and third support, whereby one of said wires increases in tension while the other of said wires decreases in tension on said displacement of said force summing means.

17. A transducer according to claim 16, wherein the spring constant of said spring is less than the spring constant of said tensioned members.

18. A transducer according to claim 16, in which the spring constant of the spring is from about .1 to about .001 times the spring constant of the tensioned members.

19. In the transducer of claim 16, wherein the tensions in said wires are equal.

20. A transducer according to claim 16, wherein the spring constant of the spring is from about .1 to about .001 times the spring constant of the tensioned members, and wherein the tensions in said wires are equal.

References Cited in the file of this patent
UNITED STATES PATENTS 2,760,037  Statham _____ Aug. 21, 1956